D. CRANE.
MAGNETIC ATTACHMENT FOR MEASURING TAPES.
APPLICATION FILED FEB. 28, 1910.
992,170.
Patented May 16, 1911.
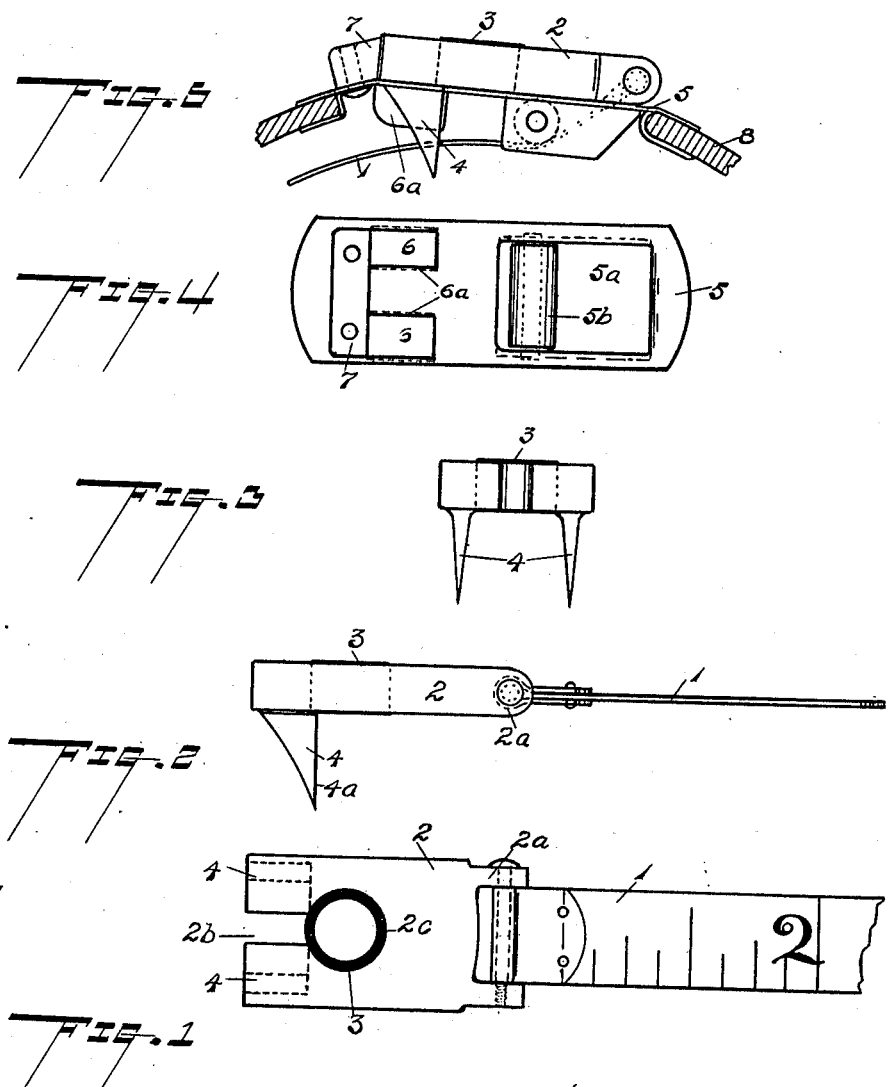

UNITED STATES PATENT OFFICE.

DANIEL CRANE, OF SAGINAW, MICHIGAN.

MAGNETIC ATTACHMENT FOR MEASURING-TAPES.

992,170. Specification of Letters Patent. Patented May 16, 1911.

Application filed February 28, 1910. Serial No. 546,401.

*To all whom it may concern:*

Be it known that I, DANIEL CRANE, a citizen of the United States, residing at Saginaw, in the county of Saginaw and State of Michigan, have invented certain new and useful Improvements in Magnetic Attachments for Measuring-Tapes; and I do hereby declare the following to be a full, clear, and exact description of the invention, such as will enable others skilled in the art to which it appertains to make and use the same.

This invention is an improvement in measuring tapes and relates more particularly to an improved attachment for the end of a measuring tape, whereby the tape is adapted for convenient use by a single person for the measuring of lengths of shafting, steel bars, or metal frames of buildings and similar purposes.

The invention is illustrated in the accompanying drawings, in which—

Figure 1 is an enlarged plan view of a tape end with the attachment in place, Fig. 2 is a side elevation of the same, Fig. 3 is an end elevation of the part shown in Fig. 2, Fig. 4 is an enlarged top plan view of the roller frame for a measuring tape case as adapted for use with my improved tape end, Fig. 5 is an enlarged part sectional side elevation of a tape case and roller frame with the tape attachment folded thereon.

As is clearly shown in the drawings, my improvement consists in the device attached to the end of a tape 1, consisting in a strongly magnetized, hardened steel plate 2, pivoted at its rear end 2ª to the end of the tape 1. The steel plate is formed with a slot 2ᵇ at its free end, the slot preferably terminating in a circular opening 2ᶜ, in which is mounted a thimble 3 of any suitable diamagnetic material. This thimble not only completes the required form for the permanent magnet but also serves as an opening through which an awl or other pointed instrument can be passed to hold the end of the tape in place when desired. The slot 2ᵇ and the opening 2ᶜ bifurcate the free end of the magnetized plate, giving it approximately the form of a horse-shoe or U-magnet.

Projecting at right angles from one face of the plate 2 and attached to the pole ends of the magnet, are prongs 4, the rear faces 4ª being vertical to engage the end of a shaft or metal beam to be measured. The prongs are preferably sharpened at their tips, enabling them to be conveniently driven into the wood-work when it is desired to use the device for measuring such material. The rear edges of the prongs 4 also form the starting point for the tape measurement.

When the device is used in measuring shafting and the like, the prongs 4 take the pull of the tape while the ends of the permanent magnet 2 cause the magnet to tightly adhere to the shaft while the operator is extending his tape and taking measurements along the shaft.

When the tape is wound in its case, the magnet 2 and prongs 4 are compactly folded against and retained in place by the roller frame 5, as illustrated in Figs. 4 and 5. The frame 5 is provided with the usual opening 5ª, through which the tape travels, being guided by the roller 5ᵇ, and the frame is, in addition, provided with two openings 6, 6, to receive the prongs 4. The openings 6, 6 are preferably formed by first slitting the metal of the frame 5, and folding down the lips so formed, to provide side guides or wings 6ª for the openings 6, 6.

Just forward of the opening 6 and secured to the frame 5 by riveting or otherwise, is a steel armature 7 against which the ends of the magnet 2 rest when the tape is rolled into the case 8. The armature 7 holds the magnet 2 tightly in place while the tape is not in use, and preserves the permanency of the magnet.

While I have shown and described the plate 2 as made of a single piece of hardened steel, it is obvious that it can be made in any manner suitable to the construction of permanent magnets.

By the means above described I have produced a holding attachment for tapes, that can be easily and conveniently used in the measuring of shafting, iron work and for like service, by a single person, without the necessity of having an assistant to hold the end of the tape line.

Having thus fully described my invention, what I claim and desire to secure by Letters Patent, is:

1. An attachment for measuring tapes, comprising a permanent U-magnet, said magnet being pivotally mounted at its bowed portion on the end of said tape, together with a downwardly projecting prong fixed to each of the ends of said magnet.

2. An attachment for measuring tapes, comprising a permanent U-magnet, said magnet being pivotally mounted at its bowed portion on the end of said tape, together with a thimble of diamagnetic material passing through said magnet at the rear of the magnet poles.

3. An attachment for measuring tapes, comprising a permanent U-magnet, said magnet being pivotally mounted at its bowed portion on the end of said tape, a tape case, and a roller frame mounted thereon, and an armature carried by said frame and adapted to engage the poles of said magnet when the tape is not in use.

4. An attachment for measuring tapes, comprising a permanent U-magnet, said magnet being pivotally mounted at its bowed portion on the end of said tape, together with downwardly projecting prongs fixed to the ends of said magnet, a tape case, and a roller frame mounted thereon, said frame formed with a pair of openings adapted to receive said prongs, and an armature carried by said frame in front of said openings and adapted to engage the ends of said magnet.

In testimony whereof, I affix my signature in presence of two witnesses.

DANIEL CRANE.

Witnesses:
CHRISTINE A. BRAIDEL,
NELLIE M. ANGUS.

Copies of this patent may be obtained for five cents each, by addressing the "Commissioner of Patents, Washington, D. C."